Nov. 14, 1961 — K. V. CUSHMAN ET AL — 3,008,552
STRUCTURAL FASTENER
Filed Oct. 28, 1958 — 2 Sheets-Sheet 2
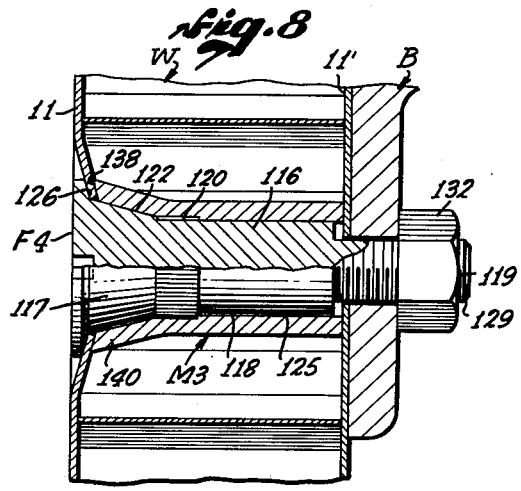
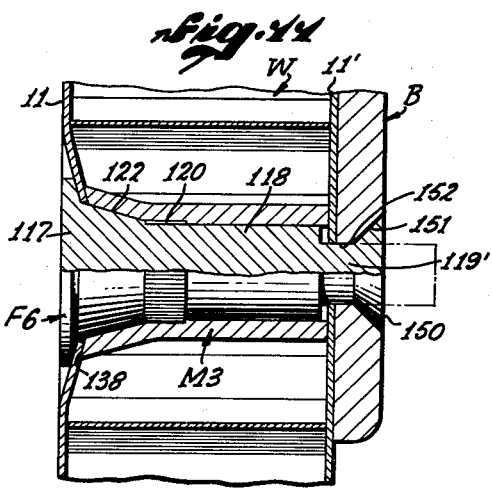
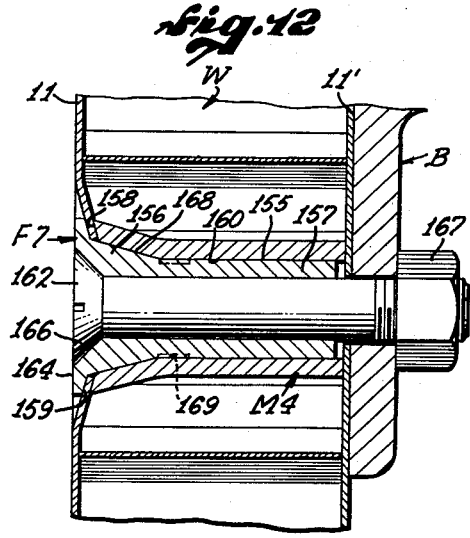
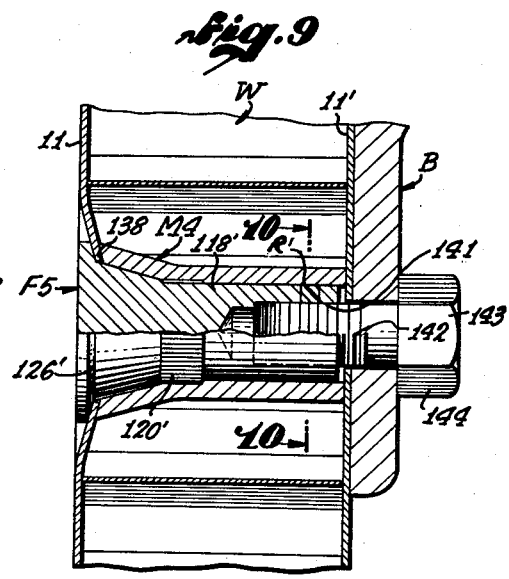
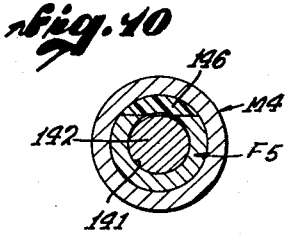
KENNETH V. CUSHMAN &
PAUL V. PAGEL,
INVENTORS.
HERZIG & JESSUP,
BY ATTORNEYS.

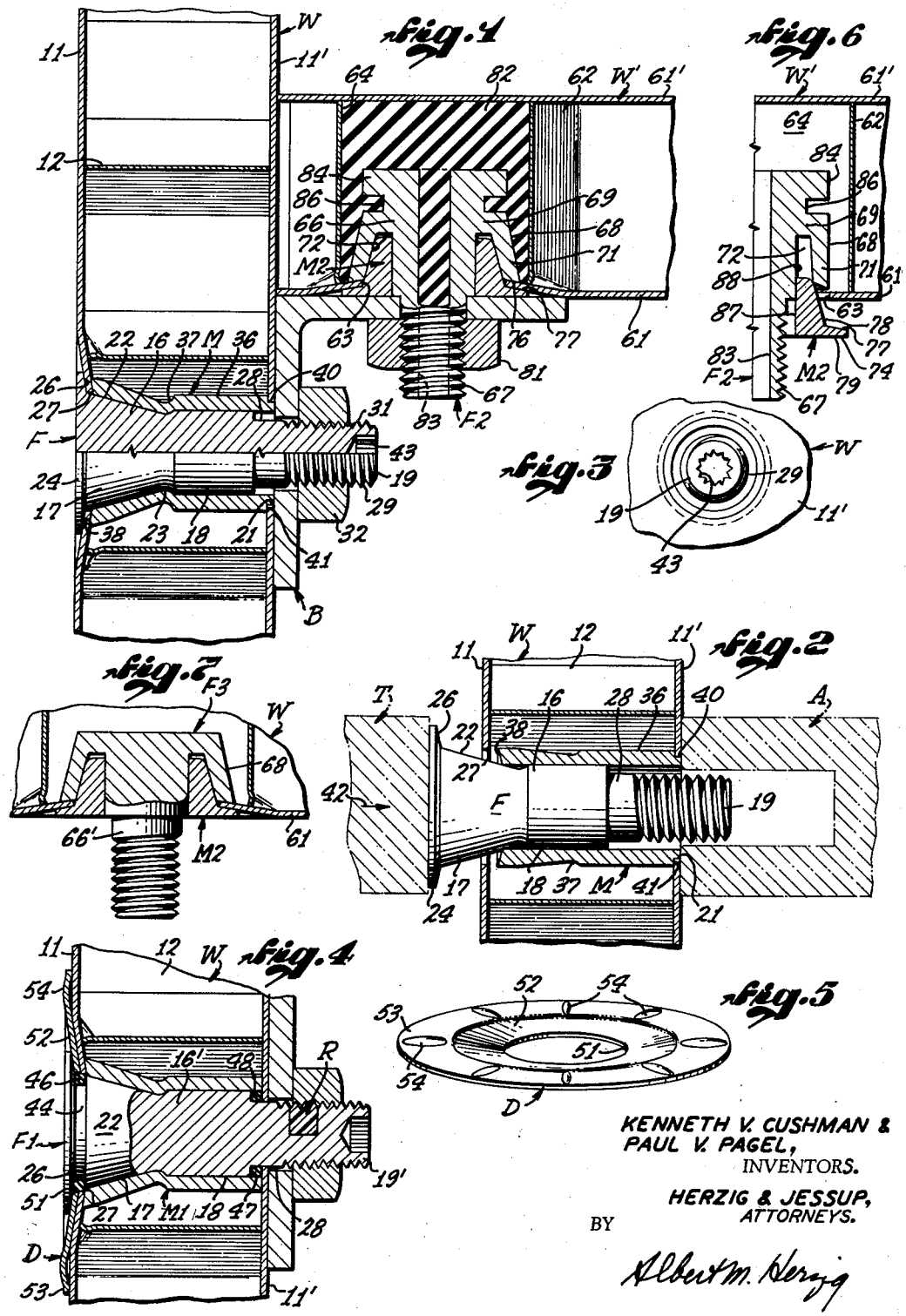

United States Patent Office 3,008,552
Patented Nov. 14, 1961

3,008,552
STRUCTURAL FASTENER
Kenneth V. Cushman, Whittier, and Paul V. Pagel, Fullerton, Calif., assignors to The Delron Company, Inc., South Gate, Calif., a corporation of Nevada
Filed Oct. 28, 1958, Ser. No. 770,171
9 Claims. (Cl. 189—34)

This invention relates to fasteners and more particularly to a structural fastener or spacer for a relatively fragile wall such as the well known honeycomb construction having relatively thin outer skins and a relatively thick cellular core sandwiched therebetween, for mounting external fittings such as brackets or the like to the wall.

Walls of the cellular, laminated honeycomb construction are relatively fragile, and while possessing sufficient strength for use as structural or non-structural panels, they are not capable of self-sustaining studs or bolts. The inner core is not dense enough to retain such fasteners without reinforcement as any load applied to the external fixture mounted to the wall tends to loosen the fastener or to pull it out of the wall by enlarging the aperture of the wall.

It is therefore an object of this invention to provide a new and improved structural fastener or spacer, which adds structural strength to a wall of laminated honeycomb or other construction and facilitates mounting of brackets or other external fixtures to the wall, wherein securement of such external fixtures serves to anchor the fastener or spacer within the wall.

A more specific object of this invention is the provision of a new and improved structural fastener or spacer which incorporates means for firmly gripping one or more of the outer skins of the wall to prevent loosening or tearing out of the fastener when a load is applied to the external fixture such means including an outer sleeve member which is expandable over an inner member to clamp one of the skins of the wall between an annular face of the outer member and an enlarged portion of the inner member while providing means for securing external fixtures to the wall, said means comprising an outwardly extending threaded or unthreaded stud or optionally internal threads within the inner member for engagement with an externally threaded bolt or screw.

A further object of this invention is to provide new and improved gripping means for a fastener of the character described which automatically dimples the skin to which it is attached in a manner to retain a flush exterior surface on one side of the wall.

A still further object of this invention is to provide a tool-engaging means on the herein provided fastener whereby a nut may be applied to the threaded portion of the stud in its threaded form to clamp a bracket or the like to the wall to prevent rotation of the stud or transmission of the torque applied to the nut and thereby to the fastener which might result in distortion or rupturing of the skin to which the fastener is secured.

It is another object of this invention to provide a new and improved structural fastener or spacer which is economical to manufacture, is readily and easily installed within the wall, and is capable of mass production.

Yet another object of this invention is to provide a structural fastener or spacer of the character described which can be installed in the wall without the necessity for using unusual or special tools.

An object of this invention is to provide a new and improved fastener which resists pulling-out of a wall by providing means for transmitting loads applied to the stud over a large area of the wall.

Yet another object of this invention is to provide a new and improved structural fastener which can be mounted within a blind hole of a wall by providing means by which the spacer may be secured to one of the outer skins of the wall by manipulation of parts thereof from one side of the wall.

A general object of this invention is to provide a new and improved stud structural fastener or spacer which overcomes disadvantages of prior methods and devices heretofore intended to accomplish generally similar purposes.

These and other objects of this invention will be more apparent by reference to the accompanying drawings, description, and appended claims.

In the drawings:

FIG. 1 is a cross-sectional view, as taken through a pair of walls, of a honeycomb construction, joined together as by a common bracket secured to the walls by means of structural fasteners designed and constructed in accordance with this invention.

FIG. 2 is a fragmentary cross-sectional view illustrating one of the fasteners of FIG. 1 in the process of installation;

FIG. 3 is a fragmentary end view of the fastener and wall illustrated in FIG. 2;

FIG. 4 is a fragmentary cross-sectional view, similar to the left portion of FIG. 1, illustrating another embodiment of this invention;

FIG. 5 is a perspective view, in elevation, of washer means incorporated in the embodiment of FIG. 4;

FIG. 6 is a fragmentary cross-sectional view, similar to FIG. 1 showing another embodiment of this invention, in a semi-assembled position;

FIG. 7 is a fragmentary cross-sectional view, similar to the right portion of FIG. 1, illustrating a fourth embodiment of this invention;

FIG. 8 is an axial cross-sectional view, with parts shown in elevation, of another embodiment of this invention;

FIG. 9 is an axial cross-sectional view, with parts shown in elevation, of yet another embodiment of this invention;

FIG. 10 is a lateral cross-sectional view as taken on a line 10—10 of FIG. 9.

FIG. 11 is an axial cross-sectional view, with parts shown in elevation, illustrating still another embodiment; and FIG. 12 is an axial cross-sectional view, with parts shown in elevation, illustrating a still further embodiment.

Referring to the drawings, and more particularly to FIGS. 1, 2, and 3, there is shown by way of illustration, but not of limitation, a relatively fragile wall W, of the commonly used honeycomb construction, having relatively thin outer skins 11 and 11' and a relatively thick inner core 12, of honeycomb or other cellular form, sandwiched therebetween.

Such walls W are commonly used in structural or non-structural capacities, having sufficient strength to carry loads but having insufficient capacity to retain a stud, bolt or screw because of the cellular inner construction, whereby such fastening means tend to pull out or loosen under load.

In order to mount a bracket to the wall W indicated generally at B, a structural fastener or spacer generally indicated at F, designed and constructed in accordance with this invention, is advantageously utilized.

The fastener F comprises a generally cylindrical body 16 having an enlarged end 17, an intermediate portion 18, and a reduced end 19. The body 16 is mounted in the wall W with the enlarged portion 17 and intermediate portion 18 residing within the wall W and with the reduced portion 19 extending through an aperture 21 of the skin 11' and outwardly of the wall W to form an outwardly extending stud.

The enlarged portion 17 of the body 16 includes a conical outer surface 22 tapering towards the intermediate portion 19, the conical surface having its smaller diameter adjacent the intermediate portion 18 and appreciably smaller than the outer cylindrical surface of the portion 18 thereby forming a groove 23 at the intersection of the conical and cylindrical surfaces for a purpose which will be hereinafter described. The enlarged portion 17 further includes an outwardly extending radial flange 24 at the outer end thereof, the flange having a conical surface 26 on the inner face thereof. The enlarged portion 17 extends through an opening 27 of the other skin 11 of the wall W with the inner conical face 26 of the flange 24 in abutment with the outer surface of the skin 11.

The reduced stud end 19 is circumferentially relieved as indicated at 28 and is provided with external threads 29 for engagement with internal threads 31 of a nut 32.

In order to secure the body 16 to the wall W, more specifically, to one of the skins of the wall, a sleeve M is provided circumjacent to the body 16 having an inner diametrical dimension substantially complementary to the outer surface of the intermediate portion 18 of the body 16 and an outer surface 36 having a diametric dimension equal to or slightly smaller than the opening 27 in the skin 11 of the wall W, whereby the sleeve M may be inserted through the opening 27 for installation purposes.

The sleeve M includes an external annular groove 37 spaced from the ends of the sleeve M thereby to coincide with the groove 23 of the body when finally installed as will be hereinafter described. One end of the sleeve M, the end nearest the enlarged portion of the body 16, is provided with an inwardly extending conical face 38, see FIG. 2, complementary to the inner conical surface 26 of the flange 24, while the opposite end of the sleeve 33 is circumferentially relieved to form a reduced portion 40, at the end thereof, and a shoulder 41 spaced inwardly a distance corresponding substantially to the thickness of one of the skins like 11'.

To install the fastener F within the wall W, the sleeve M is inserted through the opening 27 until the reduced end 40 extends through the opening 21 of the wall W. The body 16 is then inserted into the sleeve M as far as generally indicated at T in broken lines in FIG. 2, is brought to bear against the outer surface of the flange 24 of the body 16, while an anvil, generally indicated at A in broken lines, is placed against the wall skin 11' to abut the end 40 of the sleeve means M. A pressure is applied by the tool T, in the direction indicated by the arrow 42, against the body 16 to force the enlarged conical portion 17 into the sleeve M, thereby to expand a portion of the sleeve to the position illustrated in FIG. 1, whereby the skin 11 of the wall W is clamped between the inner conical face 26 of the flange 24 and the conical face 38 of the sleeve. This action automatically causes the material of the wall skin 11 gripped by the members mentioned to dimple inwardly to conform to the conical configuration of the complementary faces 26—38, as indicated in FIG. 1, to result in a continuous co-planar relationship of the outer face of the body 16 with the outer face of the skin 11, offering no protrusions or interferences on the outer surface of the wall skin 11.

Subsequent mounting of a bracket B to the wall W is accomplished by placing the bracket B over the reduced portion 19 of the body 16 and clamping the bracket B thereto as by the nut 32. To prevent rotation of the body 16, as might be transmitted by the torque of the nut 32, tool engaging means 43 is preferably provided in the outer end of the reduced portion 19 whereby a wrench, screwdriver, or the like may be utilized to prevent rotation of the body 16 while the nut 32 is being tightened to clamp the bracket B securely against the outer end 40 of the sleeve. It will be noted that the clamping of the bracket is effected directly against the sleeve M rather than against the relatively fragile wall W thereby avoiding distortion or crushing of the wall W.

Referring to FIG. 4, another embodiment of this invention is illustrated, similar to the first embodiment described above, in which like parts are identified by like numbers. In this instant embodiment, provision is made for sealing the openings 21 and 27 of the skins 11' and 11, respectively, of the wall W for use in instances where an airtight wall is desired.

The spacer F1 includes a body 16' having an enlarged portion 17, an intermediate portion 18 and a reduced portion 19' similar to the first embodiment with the exception that an external annular groove 44 is provided on the enlarged portion 17 of the body at the intersection of the conical surfaces 26 and 22 of the flange 24 and enlarged portion 17, respectively, in which an annular resilient ring such as an O-ring rubber or neoprene packing 46 may be installed to seal the opening 27 when the spacer F1 is installed.

The sleeve means M1 is substantially identical to the sleeve means M of the above-described first embodiment of the present invention with the exception of the omission of the circumferentially relieved end 40 at the end of the sleeve means M1 adjacent the reduced end 19. The sleeve means M1 in this instant embodiment is installed having its end in abutment with the inner surface of the skin 11' of the wall W, the opening 21 in this embodiment being smaller than the opening 21 of the first described embodiment. The opening 21 of the wall W is preferably equal to or slightly larger than the reduced end 19 to form a snug fit therewith. The circumferentially relieved portion 28 of the reduced end 19, together with the sleeve M1 and the skin 11', forms an annular cavity 47 in which a resilient O-ring packing 48 is disposed to seal the opening 21 when the fastener F1 is installed.

FIG. 4 further illustrates provision of washer means indicated generally at D especially designed to distribute the load placed upon the fastener F or F1 during use, to further resist pull-out of the fasteners F—F1. As best seen in FIGS. 4 and 5 the washer D includes an opening 51 substantially complementary to the opening 27 of the skin 11 of the wall W and is adapted to be installed over the enlarged portion 17 of the bodies 16, 16'. The washer D further includes a conical surface 52 adjacent the opening 51, the conical surface 52 being substantially complementary to the conical surface 26 of the flange 24, and an outer substantially flat surface 53. The surface 53 is preferably provided with a plurality of radial beads 54 to strengthen and stiffen the washer D thereby distributing any load tending to pull the body outwardly of the wall W to a great area of the wall W.

FIG. 4 further illustrates the provision of a resilient insert R, of nylon or the like, in the reduced stud portion 19 to form a locking means for the nut 32 to prevent inadvertent loosening thereof.

The washer D may be advantageously used in any one of the embodiments described in this application, the primary purpose of the washer D being to distribute the pull-out load over a larger area of the wall W to lessen the tendency of a pull-out while the fasteners F—F1 are placed under load. The washer D further features conical and flat surfaces 52 and 53, respectively, to effect the dimpling action previously described thereby retaining a substantially flat surface on the outer surface of the wall W if desired.

Referring to the right hand portion of FIG. 1, and to FIG. 6, another embodiment of this invention is illustrated, the instant embodiment being especially useful for a blind installation under conditions where the side wall opposite the stud member protruding therefrom is inaccessible for the installation procedure previously described for the preceding embodiments.

Referring to the right hand portion of FIG. 1, there is illustrated a relatively fragile wall W', similar in sandwiched construction to the wall W and including outer skins 61, 61' and an inner cellular core 62 sandwiched therebetween. The skin 61' in this embodiment is imperforate, while the skin 61 is provided with an opening 63. The core 62 is provided with a cavity 64, aligned with the opening 63, in which a fastener F2 is installed.

The fastener F2 includes a body 66 of a generally cylindrical configuration having one end thereof disposed within the cavity 64 of the core 62 and having a reduced end 67 extending through the opening 63 and outwardly of the skin 61 to provide an externally threaded stud member or mounting of a bracket B, or other external fixtures, thereon.

In this instant embodiment, the body 66 is provided with an annular skirt member 68, comprising a radial wall 69 extending from the body 66 and an annular wall 71 which, as viewed in FIG. 6 wherein the annular wall 71 is illustrated before expansion thereof, is substantially coaxial to the body 66 and spaced therefrom to provide an annular cavity 72 having an open end facing the opening 63. The outer diameter of the annular wall 71, before installation, is preferably equal to or slightly smaller than the opening 63 whereby the body 66 may be inserted into the wall W' as through the opening 63.

To retain the fastener F2 in the wall W' and to clamp the fastener F2 to one of the skins, such as 61, a sleeve means M2 is provided to expand the annular wall 71 to a diametrical dimension larger than the opening 63 and to provide an external shoulder or flange 74 whereby the skin 61 is clamped, as seen in FIG. 1, between an outer face 76 of the annular wall 71 and an inner face 77 of the flange 74. To accomplish this, the sleeve means M2 is provided with a conical external surface 78 whose smallest diameter is equal to or slightly smaller than the inner surface of the annular wall 71, to facilitate insertion of the sleeve means M2.

Expansion of the annular wall 71 is easily and quickly accomplished by the application of well known and readily accessible tools whereby the reduced end 67 is gripped by the tool by which a force is applied to the outer surface 79 of the sleeve means M2 to extend the sleeve means M2 within the annular cavity 72 to expand the wall 71 to a position shown in FIG. 1. The outer face 76 and the inner surface 77 of the annular wall 71 and flange 74, respectively, are preferably conical and complementary to each other to effect a dimpling of the skin area 61 adjacent the opening 63 to preserve a flat outer surface of the wall W' in the area of the reduced threaded portion 67. Subsequent application of a nut 81 engaging the threads of the reduced portion 67 tends to exert a force through the bracket B against the sleeve means M2 to further tighten the clamping action on the skin 61.

FIG. 1 further illustrates the use of a cold-setting resinous potting material 82 to further strengthen and stabilize the body 66 of the fastener F2 within the cavity 64 of the wall W'. If it is desired to use such a potted-in installation, a longitudinal bore 83 is provided in the body 66 extending therethrough, through which the cold-setting resinous material may be injected until the cavity 64 is filled. In such an installation, a radial flange 84, preferably of non-circular configuration, is advantageously provided on the body 66 thereby forming a groove 86 to provide irregular surfaces on which the cold-setting material 82 flows, before setting, to effect a better gripping action on the body 66.

Referring to FIG. 7, another embodiment is illustrated, similar to the last described embodiment, which is identical in every respect thereto with the exception that the body 66' is imperforate and the flange 84 is omitted. In this instant embodiment, a fastener F3 may be utilized to provide a stud spacer in a wall W to clamp the fastener to the skin 61 without the use of the potted-in resinous compound 82 previously described. This form may also be used to mount a stud spacer F3 on a single wall or skin, wherein the sleeve means M2 expands the annular wall 71 to a position whereby the skin 61 is clamped between the outer face 76 of the annular wall 71 and the flange 74 of the sleeve means M2 to secure the spacer F3 to the wall W. In both embodiments, F2 and F3, the inner diametrical dimension of surface, indicated at 87, forms a press fit with the outer diameter 88 of the bodies 66 and 66' to form a permanent securement and prevent sleeve M2 from working loose and separating. Also, in both instances, application of an external fixture, such as the bracket B, tends to keep the sleeve M2 in its installed position and, as previously mentioned, tends to tighten the securement achieved.

Referring to FIG. 8, another modification of this invention is illustrated wherein a fastener F4 is shown having a generally cylindrical body 116, substantially similar to the body 16 of the first embodiment, having an enlarged end 117, and intermediate portion 118, and a reduced end 119 corresponding to the end 17, portion 18, and reduced end 19, respectively, of the body 16.

The enlarged portion 117 of the body 116 includes a conical outer surface 122 tapering toward the intermediate portion 18, but differs from the body 16 by providing a serrated cylindrical band 120 substantially coaxial with the cylindrical portion 118 and at the intersection of the conical surface 122 and the intermediate portion 118.

The fastener or spacer F4 includes a sleeve means M3 in telescopic relationship therewith to clamp a skin 11 of the wall W between a conical end surface 138 of the sleeve means M3 and a corresponding conical space 126 of the enlarged portion 117, similarly to the first embodiment. The sleeve means M3 is provided with an inner diametrical surface 125 having a sliding fit with the outer surface of the intermediate portion 118 whereby the end 140 of the sleeve means M3 is expanded over the conical surface 122 of the spacer F4 when the spacer is installed within the sleeve means M3, the serrations 120 biting into the sleeve means M3 to lock the sleeve means M3 to the fastener F4.

The reduced end 119 of the spacer F4 extends outwardly of the wall W, through the opposite skin 11' and through an aperture of the bracket B and is provided with external threads 129 for engagement with the internal threads of a net 132 to retain the bracket on the wall W.

In this manner, the bracket B may be removed from the wall W while the spacer F4 is retained within the wall.

With reference to FIGS. 9 and 10, a modified embodiment of this invention, similar to the embodiment described in FIG. 8, includes a fastener or spacer F5 in telescopic engagement with a sleeve means M4, the spacer F5 of the instant embodiment differing from the spacer F4 in that the intermediate portion 118' is terminated inside of the wall W, the spacer F5 being substantially shorter than the width of the wall W. The spacer F5 is locked in telescopic relationship to the sleeve M4 by the provision of an externally serrated portion 120', similar to the serrated portion 120 of the spacer F4. The skin 11 of the wall W is clamped between the conical end face 138 of the sleeve means M4 and the complementary conical face 126' of the spacer F5.

The cylindrical portion 118' of the spacer F5 is provided with an axial bore 141 which is internally threaded for engagement with the external threads 142 of a screw or bolt 143. The bolt 143 extends through the aperture of the bracket B and is provided with an enlarged head 144 to bear against the external surface of the bracket, to hold the bracket in place on the wall W. In order to prevent loosening of the thread 142 within the threaded bore 141, an insert R' is preferably provided in the wall of the spacer F5, the insert being of nylon, fiber or other suitable material, to lock the threads 142 against inadvertent rotational movement.

With reference to FIG. 11, a fastener or spacer F6 is illustrated, substantially similar to the fastener F4 of FIG. 8, wherein like parts are referred to by like numbers. In this instant embodiment the bracket B is retained on the wall W by a reduced end 119' extending outwardly of the wall and through bore of the bracket B, the reduced end being flattened, peened or riveted, as indicated at 150, to form a head residing in a countersunk portion 151 of the bore 152 extending through the bracket B. As in the embodiment illustrated in FIG. 8, the spacer F6 includes a conical surface 120 at the intersection thereof. The enlarged head 117 of the spacer F6 clamps the skin 11 between its inwardly-facing conical surface 126 and an outwardly-facing conical face 138 of the expanded end of spacer means M3. It is to be understood that the end may be riveted in various forms, as with a flat or enlarged head, if desired, and the countersink 151 of the bore 152 omitted.

It is to be understood that, although fasteners F2 and F3 have been illustrated and described herein as having outwardly extending externally threaded reduced portions or studs 67, it is within the scope of this invention to provide an internally threaded longitudinal bore in the bodies 66, 66' for receiving therein, in threaded engagement, the externally threaded shank of a bolt, like bolt 143 of FIG. 9, having an enlarged head 144 bearing against the external surface of a bracket B to hold the bracket in place on the wall W.

With reference to FIG. 12, a further embodiment of this invention is illustrated wherein a fastener or spacer F7 includes a body 155 having an enlarged end 156 and a cylindrical portion 157 telescoping within a sleeve means M4 to expand the end of the sleeve means over the enlarged portion 156 of the spacer F7, thereby clamping the skin 11 on the wall W between an outwardly-facing conical surface 159 of the spacer F7.

In this instant embodiment, the spacer F7 is provided with an axial bore 160 therethrough. An elongated shaft 161 having an enlarged head 162 and a threaded end 163 extends through the bore 160 of the spacer F7, with the enlarged head 162 in abutment with the outer surface 164 of the spacer F7 or as illustrated, residing within a countersunk portion 166 of the bore 160 in the event that a flush outer wall surface is desired. The threaded end 163 extends through the skin 11', outwardly of the wall W, and through an aperture of the bracket B for engagement with the internal threads of a nut 167 to clamp the bracket B on the wall W. It it is desired to retain the spacer F7 permanently within the wall W, the intersection of the conical outer surface of the enlarged portion 156 of spacer F7 and the cylindrical portion 157 thereof may be provided with a serrated outer surface as indicated in dotted lines 169 to lock the sleeve means M4 to the spacer F7.

If a heavy load is anticipated to be carried by the bracket B, a washer D, as previously described, may be interposed between the inner conical surfaces of the fasteners F4, F5, F6 and F7 and the outer conical surfaces of the spacer means M3 and M4 to transmit the load more evenly to a larger surface area of the skin 11 to prevent rupturing of the skin 11 or pulling through of the spacer.

While we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent devices and methods.

What we claim as new and desire to secure by Letters Patent is:

1. A structural spacer, comprising; a generally cylindrical hollow tubular body of malleable metal at least one end portion of which is peripherally continuous; a clamping element having a cylindrical shank of a size to enter and be guided by the interior of said body and of a length to extend substantially therethrough, a conical portion flaring outwardly from one end of said shank, a flange-like head extending laterally from the outer end of said conical portion, the diameter of said conical portion adjacent said head being substantially equal to the outer diameter of said one end portion of said body; and means on said clamping element for engagement by force applying means to force said conical portion into said body to flare said one end portion outwardly, and to hold said clamping element in said position.

2. A structural spacer as defined in claim 1 wherein the annular surface at said one end of said tubular body is of inwardly tapering shallow conical shape, the inner surface of said flange-like head also being of inwardly tapering shallow conical shape.

3. A structural spacer as defined in claim 1 including a circumferential groove in said clamping element substantially at the juncture of said shank and said conical portion.

4. A structural spacer as defined in claim 1 wherein a portion of said shank is longitudinally fluted whereby to frictionally lock said clamping element in said tubular body.

5. A structural spacer as defined in claim 1 wherein said means on said clamping element comprise screw threads at the outer end portion of said shank.

6. In combination, a structural spacer and a wall having spaced outer layers of thin fragile material, said spacer comprising; a hollow tubular spacer body of malleable metal between said outer layers and bearing at its ends against the inner faces of said layers, an opening through each of said layers in concentric alignment with said body, the portion of said body adjacent one of said openings being circumferentially continuous and flared laterally to underlie the periphery of said one opening; a clamping member extending through said body and holding said portion of said body in flared condition, said clamping member having a laterally extending head at one end adjacent said flared portion engaging the outer surface of the adjacent layer and clamping the same against the end of said flared portion around the entire periphery of said opening; and means engaging the other end of said clamping member and having a portion outwardly of the other opening serving to clamp the other layer against the other end of said body and to hold said clamping member in the described position.

7. The combination defined in claim 6 including a circumferential groove in said clamping member substantially at the inner end of said portion, a portion of the metal of said body extending into said groove to assist in locking said clamping member in position.

8. The combination of claim 6 wherein the outer end of said head is substantially flush with said one layer, the inner annular face of said head tapering conically inwardly, the outer layer around said one opening being dimpled inwardly along said tapering annular face.

9. The combination of claim 8 wherein the outer edge surface of said flared portion tapers inwardly substantially parallel to said tapering face of said head.

References Cited in the file of this patent

UNITED STATES PATENTS

| | | |
|---|---|---|
| 1,835,243 | Schaffert | Dec. 8, 1931 |
| 2,700,172 | Rohe | Jan. 25, 1955 |
| 2,765,699 | La Torre | Oct. 9, 1956 |
| 2,784,758 | Rohe | Mar. 12, 1957 |
| 2,836,215 | Rapata | May 27, 1958 |